US010479527B2

(12) United States Patent
Bistuer et al.

(10) Patent No.: US 10,479,527 B2
(45) Date of Patent: Nov. 19, 2019

(54) EXTERNAL ANCHORING HARPOON FOR AIRCRAFT

(71) Applicant: AIRBUS HELICOPTERS, Marignane (FR)

(72) Inventors: Olivier Bistuer, La Fare les Oliviers (FR); Jean Paul Renaud, Vitrolles (FR); Patrice Garcin, Ensues (FR); Pierre Prud'Homme Lacroix, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 254 days.

(21) Appl. No.: 15/714,049

(22) Filed: Sep. 25, 2017

(65) Prior Publication Data

US 2018/0086482 A1 Mar. 29, 2018

(30) Foreign Application Priority Data

Sep. 23, 2016 (FR) ...................................... 16 01387

(51) Int. Cl.
*B64C 25/32* (2006.01)
*B64F 1/12* (2006.01)
*B64C 25/68* (2006.01)

(52) U.S. Cl.
CPC .............. *B64F 1/125* (2013.01); *B64C 25/32* (2013.01); *B64C 25/68* (2013.01); *B64C 2025/325* (2013.01)

(58) Field of Classification Search
CPC ......... B64F 1/125; B64C 25/32; B64C 25/68; B64C 2025/325

USPC ....................................................... 244/110 F
See application file for complete search history.

(56) References Cited

U.S. PATENT DOCUMENTS

| 1,760,881 | A | 6/1930 | Minshall | |
| 1,893,591 | A | 1/1933 | Minshall | |
| 4,834,321 | A * | 5/1989 | Granger | B64F 1/007 244/110 E |
| 8,991,754 | B2 | 3/2015 | Affre De Saint Rome | |

(Continued)

FOREIGN PATENT DOCUMENTS

| CA | 2757167 A1 * | 10/2010 | ............. F16B 21/16 |
| CA | 2831854 A1 * | 10/2012 | ............. B64F 1/125 |

(Continued)

OTHER PUBLICATIONS

French Search Report for French Application No. FR 1601387, Completed by the French Patent Office, dated Sep. 20, 2017, 6 pages.

*Primary Examiner* — Christopher P Ellis
(74) *Attorney, Agent, or Firm* — Brooks Kushman P.C.

(57) ABSTRACT

An external anchoring harpoon for an aircraft in order to anchor the aircraft on an anchor grid of a platform, the external anchoring harpoon comprises a frame connected to the aircraft, a harpoon head, and a deployment device for deploying the harpoon head. The deployment device comprises a cable, a movement device for moving the cable connected to the frame, the cable being connected to the harpoon head and to the movement device. The deployment device also comprises a main telescopic strut and two secondary telescopic struts so as to enable the harpoon head to be centered under the aircraft and so as to enable the harpoon head to be anchored to the anchor grid.

16 Claims, 4 Drawing Sheets

(56) References Cited

U.S. PATENT DOCUMENTS

| | | |
|---|---|---|
| 2005/0269450 A1 | 12/2005 | Muylaert et al. |
| 2014/0263823 A1* | 9/2014 | Wang .................. B64C 39/028 244/17.23 |
| 2015/0151852 A1* | 6/2015 | Cardell .................. B64F 1/125 244/110 E |
| 2017/0057626 A1* | 3/2017 | Lauder .................. B64C 25/68 |

FOREIGN PATENT DOCUMENTS

| | | | |
|---|---|---|---|
| EP | 0611693 A1 * | 8/1994 | ............. B64F 1/125 |
| FR | 2982241 A1 * | 5/2013 | ............. B64F 1/125 |
| WO | 2010112716 A1 | 10/2010 | |

* cited by examiner

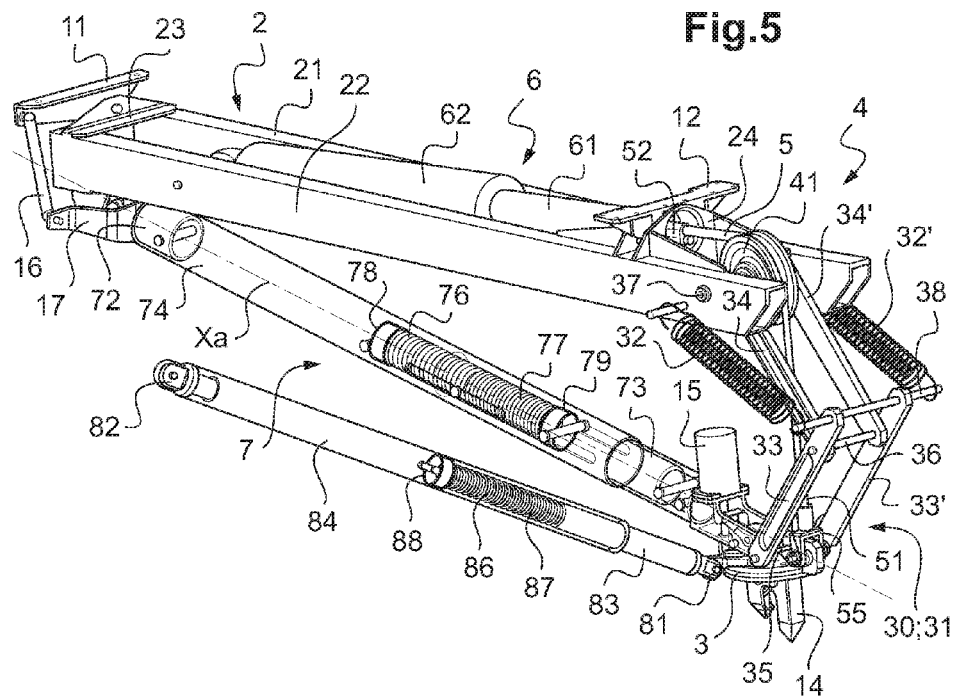
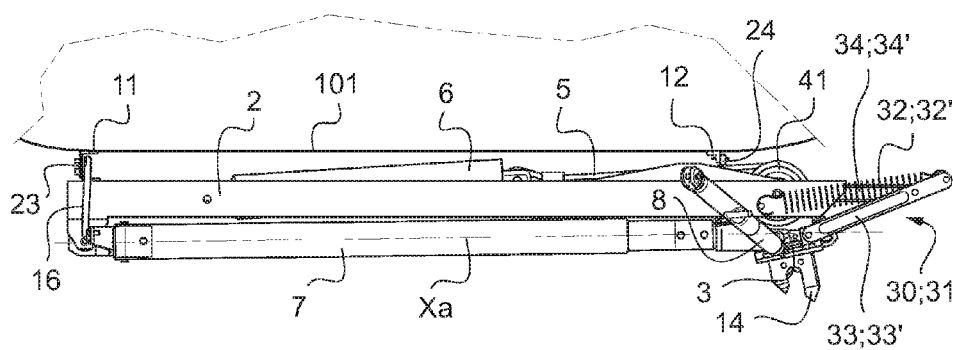

EXTERNAL ANCHORING HARPOON FOR AIRCRAFT

CROSS-REFERENCE TO RELATED APPLICATIONS

This application claims priority to French patent application No. FR 16 01387 filed on Sep. 23, 2016, the disclosure of which is incorporated in its entirety by reference herein.

BACKGROUND OF THE INVENTION

(1) Field of the Invention

The present invention lies in the field of means for holding an aircraft on a platform, e.g. situated on a ship or indeed a building.

The present invention relates to an external anchoring harpoon for aircraft, such as a rotary wing aircraft or indeed a drone, for example. The present invention also relates to an aircraft having such an external anchoring harpoon.

(2) Description of Related Art

An anchoring harpoon for an aircraft has two functions. Firstly it serves to provide assistance and safety while landing the aircraft on a ship, and secondly it serves to create an anchor point between the aircraft and the platform of the ship so as to hold the aircraft in a substantially stationary position independently of the movements of the ship, and in particular of its angle of inclination and/or of the wind to which the aircraft is subjected.

An anchoring harpoon can also provide assistance and safety while landing on a platform situated on an oil rig or indeed on the roof of a building, e.g. a hospital. For simplification purposes, in the description below, the use of such an anchoring harpoon is described solely for landing on a ship, which constitutes its most usual use.

The use of such an anchoring harpoon thus enables flight conditions in which the aircraft can take off and land to be extended, and also enables the theoretical tilt angle of the aircraft to be increased, since the tilting moment of the aircraft is compensated by the traction force of the anchoring harpoon.

An anchoring harpoon is generally arranged under the fuselage of the aircraft, between the wheels of the main landing gear or between the skids of the landing gear, and it comprises a movable harpoon head provided with a clamp or a hook that, during landing, locks automatically to an anchor grid secured to a platform situated on the ship.

Furthermore, after anchoring, by applying a traction force between the anchor point and the aircraft, the anchoring harpoon enables the aircraft to be pressed against the platform in order to increase its stability and ensure that it is held on the platform. The anchoring harpoon thus makes it possible, over a certain range of angles of inclination of the ship and over a certain range of winds, to replace a mooring system, at least temporarily.

An anchoring harpoon includes deployment means for deploying the harpoon head and that serves firstly to move the harpoon head during landing in order to enable it to become attached to the anchor grid of the platform, and secondly to apply a traction force on the harpoon head for the purpose of pressing the aircraft against the platform.

The anchor grid is generally of standard shape and includes openings in which the movable harpoon head can become attached. The shape of these openings makes it possible on first contact between the harpoon head and the anchor grid to direct the clamp or the hook into an opening.

The deployment means for deploying the harpoon head are generally a hydraulic actuator secured to the structure of the aircraft. The actuator performs two functions: firstly it applies an anchoring force while the aircraft is landing; and secondly it applies a traction force for holding the aircraft on the platform. The actuator used in existing harpoon devices is generally installed in a vertical direction corresponding to the direction of the anchoring force and of the traction force.

In the context of the present description, the vertical direction should be understood relative to the aircraft, and in particular relative to the bottom face of the fuselage of the aircraft. Specifically, this vertical direction is parallel to an elevation direction Z of the aircraft and substantially perpendicular to the bottom face of the fuselage of the aircraft. Likewise, a horizontal plane is a plane perpendicular to the vertical direction and thus parallel to a plane formed by the longitudinal and transverse directions X and Y of the aircraft.

Given the deployment strokes that are needed during landing, a vertically installed actuator with a piston that is simple, i.e. a piston that is not telescopic, occupies more than the space available between the platform and the bottom face of the fuselage when the aircraft is standing on the platform. In addition, a certain amount of ground clearance must be allowed between the anchoring harpoon and the ground plane in order to avoid contact during a landing when the anchoring harpoon is not used.

Consequently, such an actuator needs to pass through the bottom of the fuselage of the aircraft, which is where the fuel tanks are usually to be found. As a result, structural modifications of the aircraft are needed, leading in particular to a significant loss of the working volume of fuel.

This drawback can be reduced in part by using a telescopic actuator having a staged piston, thereby making it possible to limit the length of the actuator when retracted and thus reduce the space occupied by the anchoring harpoon, as described in Document WO 2010/112716. According to that document, an anchoring harpoon for use in particular by a drone comprises a telescopic actuator that is positioned vertically under the fuselage of the aircraft. The actuator is pneumatic and powered by a gas cartridge. Nevertheless, since a telescopic actuator is made up of a plurality of stages, it remains a solution that is complex and burdensome.

However, regardless of whether it has a simple piston or a staged piston, the actuator is installed at least in part inside the aircraft, passing through the bottom of the fuselage of the aircraft. Consequently, major structural adaptations are needed in order to install that actuator, in particular to guarantee sealing of the bottom of the fuselage and consequently buoyancy of the aircraft, and might involve modifying the way their fuel tanks are installed and their volumes.

Furthermore, the harpoon head generally includes locking means in order firstly to enable the clamp or the hook of the harpoon head to be locked automatically to the anchor grid during landing, and secondly to hold the harpoon head in the locked position on the anchor grid. The locking means are conventionally actuated by control means, generally a hydraulic actuator.

For example, the harpoon head includes a clamp formed by two jaws that are open in the unlocked position and that close automatically when the two jaws are in respective openings in the anchor grid and the harpoon head exerts sufficient force on the anchor grid to anchor the harpoon head to the anchor grid. The locking means then prevent the clamp from opening.

In another example described in Document WO 2010/112716, the harpoon head has a hook provided with three retaining fingers arranged radially at 120° from one another. The fingers do not project from the harpoon head in the unlocked position, and they are extended to project radially and automatically when the harpoon head exerts a sufficient force on the anchor grid to anchor the harpoon head in an opening in the anchor grid. The locking means then prevent the fingers of the hook from retracting.

Furthermore, the clamp or the hook is generally connected to the harpoon head so as to be free to rotate about a substantially vertical axis, firstly so as to enable the clamp or the hook to swivel during landing so that it can become anchored to the anchor grid, and secondly so as to make it easy to turn the aircraft about a substantially vertical axis after the harpoon has become anchored to the platform. This easy rotation of the aircraft makes it possible, by way of example, to turn it to face the wind for takeoff purposes or indeed to align it with an entrance to a hangar.

In addition, the position of the harpoon head can be controlled in a horizontal plane under the fuselage of the aircraft in order to limit its angle relative to the platform, the vertical actuator providing vertical retention.

For this purpose, one or more horizontal telescopic struts are arranged under the fuselage, being fastened at one end to the fuselage and at the other end to the harpoon head. Those horizontal telescopic struts serve to take up the major portion of the retaining forces of the harpoon in a horizontal plane. The way they are installed is appropriate for simple piston actuators of considerable length so as to reduce or indeed eliminate bending stresses in the actuator. In contrast, such horizontal telescopic struts are installed under the fuselage of the aircraft and thus in the proximity of fuel tanks. There therefore exists a major risk of damaging those tanks in the event of the aircraft landing roughly or crashing.

BRIEF SUMMARY OF THE INVENTION

An object of the present invention is to be unaffected by the above-mentioned limitations and to propose an external anchoring harpoon that is of small vertical size, and as a result that does not intrude into the structure of the aircraft. Furthermore, the external anchoring harpoon of the invention provides a wide range of movements for the harpoon head, while limiting the mechanical stresses generated on its components. Finally, the external anchoring harpoon of the invention enables it to be installed completely outside the aircraft and thus enables it to be installed on a large number of existing aircraft without complex and expensive modifications.

In this context, the present invention provides an external anchoring harpoon for aircraft. The invention also provides an aircraft fitted with such an external anchoring harpoon.

According to the invention, the external anchoring harpoon for an aircraft is for co-operating with an anchor grid of a platform, in particular on a ship, in order firstly to make landing of the aircraft on the platform safe and secondly to hold the aircraft down on the platform. The external anchoring harpoon may also co-operate with an anchor grid of a platform situated on an oil rig or indeed on the roof of a building, mainly so as to secure landing of the aircraft on the platform.

The external anchoring harpoon comprises:
a frame configured to be connected to the aircraft;
a harpoon head connected to become anchored to the anchor grid of the platform; and
a deployment device for deploying the harpoon head.

The external anchoring harpoon of the invention is for aircraft and in particular for rotary wing aircraft and for drones.

The external anchoring harpoon for aircraft of the invention is remarkable in that the deployment device comprises:
flexible connection means having a first end and a second end and connected via the first end to the harpoon head;
a movement device for moving the flexible connection means and connected firstly to the frame and secondly to the second end of the flexible connection means;
a main telescopic strut of elongate shape having a third end and a fourth end, and connected respectively via the third end to the harpoon head and via the fourth end to the frame; and
at least one secondary telescopic strut of elongate shape having a fifth end and a sixth end, and connected via the fifth end to the harpoon head and configured to be connected via the sixth end to the aircraft.

The external anchoring harpoon of the invention is preferably arranged under the fuselage of the aircraft and externally relative to the fuselage. The frame and the sixth end of each secondary telescopic strut are thus connected to the aircraft, preferably to structural elements of the aircraft, constituting strong points that are capable of transmitting forces, such as elements of the frame for attaching the main landing gear of the aircraft. The harpoon head is situated substantially between the wheels or between the skids of the landing gear.

Each main or secondary telescopic strut is of elongate shape along an elongation axis and is provided with two tubes capable of sliding one relative to the other, and together with at least one resilient means. A telescopic strut generally has two opposing resilient means constituted by compression springs. Thus, as soon as a telescopic strut is moved away from an equilibrium length, the telescopic strut then being compressed or else tensioned, a force appears parallel to the elongation axis and tending to return the strut to its equilibrium length.

For simplification purposes, the term "strut" is used in the description below to designate a telescopic strut.

The harpoon head is thus connected firstly to the frame by the assembly formed by the flexible connection means and the movement device, and secondly to the frame by the main strut and to the aircraft by at least one secondary strut. The flexible connection means thus connect the movement device and the harpoon head in flexible manner, thus making it possible firstly to transmit a traction force between the movement device and the harpoon head and secondly to change the direction of the traction force.

The flexible connection means may be a cable, a chain, a strap, a tape, a ball cable, or any other flexible connection means. By way of example, the flexible connection means may be made of metal or of synthetic material.

In the description below, the flexible connection means used is a cable, however the cable could be replaced by any other flexible connection device.

The deployment device enables the harpoon head to be deployed in a direction that is substantially vertical relative to the frame, and consequently relative to the fuselage of the aircraft by means of the cable and of the movement device. The harpoon head can move from a stowed position in which the harpoon head is situated in the proximity of, or in contact with, the frame, to an extreme position in which the harpoon head is remote from the frame at a predefined distance in the vertical direction. The struts are connected to the harpoon head in such a manner that they reach their equilibrium lengths at the extreme position. As a result, no force is exerted by any strut on the harpoon head when the harpoon head is situated at its extreme position.

In contrast, each strut is compressed, with its length then being shorter than its equilibrium length, whenever the harpoon head is situated between the stowed position and the extreme position. Consequently, each strut exerts a force on the harpoon head along the elongation axis of the strut when the harpoon head is situated between the stowed position and the extreme position. This force is at a maximum in the stowed position.

As a result, the forces exerted on the main strut and on each secondary strut serve firstly to control the movements of the harpoon head relative to the frame in a substantially horizontal plane, and secondly to exert a vertical force on the harpoon head tending to move the harpoon head vertically away from the frame towards the extreme position. This extreme position generally lies outside the utilization range of the external anchoring harpoon so that the strut always exerts forces on the harpoon head within its utilization range.

The movement device and the cable thus co-operate with the struts firstly to ensure a vertical first movement of the harpoon head, the harpoon head moving away from the frame and consequently from the fuselage of the aircraft, and secondly to ensure a second movement of the harpoon head, the harpoon head approaching the frame, and consequently the fuselage of the aircraft. The first movement of the harpoon head is obtained under the action of the vertical forces generated by the main and secondary struts, while the movement device reduces the tension applied to the cable. The second movement of the harpoon head is obtained under the action of the tension generated in the cable by the movement device, the movement device increasing the tension applied to the cable, with this tension then opposing the forces exerted by the struts.

During the first movement and the second movement, the struts also serve to center the harpoon head under the fuselage of the aircraft. This centering makes it possible to keep the harpoon head close to a predefined vertical straight line. This predefined vertical line serves in particular to make it easy to turn the aircraft once the harpoon head is anchored to the anchor grid, e.g. in order to orient the aircraft for a takeoff or indeed to put it into a hangar.

Furthermore, because the lengths of the struts can be varied, they enable the harpoon head to lie within a substantially horizontal plane that is favorable to anchoring the harpoon head to the anchor grid of the platform. Specifically, and as mentioned above, during first contact between the harpoon head and the anchor grid, the clamp or hook of the harpoon head must be capable of moving in order to become anchored to the anchor grid. Because of the presence of the main and secondary struts, the deployment device has the ability to move in a substantially horizontal plane in order to move the harpoon head so as to match the positions of the anchor grid and of the openings that it includes.

Advantageously, the vertical force applied by each strut on the harpoon head then enables the harpoon head to apply the force needed for anchoring it and locking it to the anchor grid.

The use of flexible connection means such as a cable is made possible because the means for moving the harpoon head do not need to be reversible, i.e. they do not need to be capable on their own of moving the harpoon head both away from and towards the frame, and as a result, the use of this cable combined with the movement device suffices. Specifically, the external anchoring harpoon of the invention advantageously makes it possible to dissociate the two functions constituted by applying an anchoring force when the aircraft lands and applying a traction force in order to hold the aircraft on the platform. Consequently, the movement device exerts a force that is mainly in traction on the harpoon head via the cable in order to urge the harpoon head towards the frame, thereby holding the aircraft on the platform, while moving the harpoon head away from the frame is performed by the action of the struts as a result of a reduction in the tension applied to the cable, thereby enabling anchoring to the anchor grid.

Nevertheless, the flexible connection means could optionally be replaced by a hoist linkage, e.g. made up of a plurality of links or rods and capable of controlling the movements of the harpoon head, and in particular capable of moving the harpoon head away from and towards the frame. Advantageously, the use of flexible connection means, such as a cable, in the means for moving the external anchoring harpoon of the invention makes it possible to limit the weight and the size of the deployment device and also its complexity compared with such a hoist linkage.

Furthermore, in contrast to an existing hoist linkage or harpoon device, the use of such flexible connection means makes it possible to avoid a substantially vertical force being transmitted to the movement device, to the frame, and consequently to the aircraft when the harpoon head makes contact with and becomes attached to the anchor grid. Specifically, the cable is relatively flexible, which means that it transmits only a traction force when the cable is tensioned. The use of the cable or of any other flexible connection means thus advantageously makes it possible during a landing, which might be rough, to ensure that the harpoon head becoming attached to the anchor grid does not damage the aircraft via the movement device.

The movement device may be a winder device for winding the cable, e.g. driven by an electric or hydraulic motor. The cable is thus wound onto the winder device in order to put the cable under tension and is unwound from the winder device in order to reduce the tension of the cable and thus enable the harpoon head to move away from the fuselage.

Preferably, the movement device is constituted by an actuator comprising a rod and a cylinder. The rod is thus retracted into the cylinder in order to tension the cable, thereby giving rise to the second movement of the harpoon head, and is extended from the cylinder in order to reduce the tension in the cable, thereby giving rise to the first movement of the harpoon head. The actuator is preferably hydraulic, however it could equally well be pneumatic or electric. By way of example, the movement device may be an actuator having a simple piston.

The frame may be configured to be connected to the aircraft via the bottom face of its fuselage by at least two pivot connections that are substantially in alignment. By way of example, the frame is fastened to at least two fittings secured to the structure of the aircraft, these pivot connections being arranged between the fittings and the frame. These pivot connections enable the frame to be hinged relative to the aircraft thus enabling the position of the frame to adapt automatically to the direction of the traction in the cable, thereby limiting the mechanical stresses transmitted to the frame. This traction direction may specifically present an angle relative to a vertical direction as a function of the movements of the harpoon head in a horizontal plane.

These pivot connections could nevertheless be replaced by ball-joint connections in order in particular to compensate for the connections not being exactly in alignment.

Nevertheless, the frame may be configured to be connected to the aircraft in rigid manner via one or more rigid end-restraint type connections. In this configuration, the frame may equally well be made up of one or more structural elements of the aircraft.

The frame may be made of metal or it may be of composite materials. The frame may optionally be faired in order to limit its impact on the aerodynamic behavior of the aircraft in flight, and in particular on its aerodynamic drag.

Furthermore, the deployment device may comprise an angle-changer device in order to guide the cable as it moves and change the direction of the traction force applied to the harpoon head. The angle-changer device is connected to the frame and arranged between the movement device and the harpoon head. The angle-changer device thus enables the direction of the cable to be changed and it contributes to reducing the overall size of the external anchoring harpoon of the invention. Such angle-changer device is necessary in particular when the movement device is offset from a vertical direction going through the harpoon head. In order to minimize the overall size of the external anchoring harpoon of the invention, the movement device may for example be an actuator arranged in substantially horizontal manner under the fuselage of the aircraft.

By way of example, the angle-changer device may be connected to the frame via a pivot connection, in particular when the frame is connected to the aircraft via pivot connections. Specifically, variations in the angle of the cable are then accommodated mainly by the pivot connections between the frame and the aircraft, in particular in order to adapt variations in the traction direction of the cable resulting from the movements of the harpoon head. In contrast, when the frame is connected to the aircraft by rigid end-restraint type connections, the angle-changer device may be connected to the frame via two pivot connections in order to accommodate the angular variations of the cable. The angle-changer device may also be connected to the frame via a ball-joint connection.

By way of example, the angle-changer device may be a sheave having a groove for guiding the cable.

In addition, the movement device is preferably arranged in the frame in order to limit the overall size of the external anchoring harpoon. Such a configuration also makes it possible to limit the impact of the movement device on the aerodynamic behavior of the aircraft in flight, and in particular on its aerodynamic drag. In particular, when the movement device comprises an actuator, the actuator is arranged in substantially horizontal manner under the fuselage of the aircraft. Such a horizontal position makes it possible firstly to limit the overall size of the external anchoring harpoon of the invention under the fuselage of the aircraft, and secondly to avoid any intrusion of the actuator into the inside of the aircraft fuselage.

Several configurations of the main or secondary struts can be envisaged in different embodiments of the invention.

In a manner that is common to these various embodiments, the main strut is provided with a first tube and a second tube that slide relative to each other along a slideway connection. The first tube is connected to the harpoon head at the third end by a rigid end-restraint type connection, and the second tube is connected to the frame at the fourth end by a ball-joint connection. The main strut has two opposing first resilient means.

Each secondary strut is provided with a third tube and a fourth tube sliding relative to each other together with at least one second resilient means. The third tube is connected to the harpoon head at the fifth end by a ball-joint connection and the fourth tube is connected to the aircraft at the sixth end likewise via a ball-joint connection. Each secondary strut is preferably fastened by a ball-joint connection to a structural element of the aircraft, e.g. an element of the frame for attaching the main landing gear, and via a support. The third tube and the fourth tube may be connected together via a sliding pivot connection or else via a slideway connection.

The positions of the struts may be guided by potential for structural take-up, each strut being arranged in particular at a strong point of the structure of the aircraft, while complying with a balanced distribution of forces in the strut and while maintaining a stable position for the harpoon head.

Each first and/or second resilient means may conventionally be a compression spring. Nevertheless, first and/or second resilient means may be replaced by a mechanical device, such as a pneumatic pusher.

In a first embodiment of the invention, namely the preferred embodiment of the invention, the movement device comprises a main strut and two secondary struts in a Y-configuration under the fuselage of the aircraft. The two secondary struts are arranged on either side of the harpoon head and are thus substantially in opposition to each other. Each secondary strut has a single second resilient means.

Specifically, since the two secondary struts are arranged on either side of the harpoon head, the second resilient means of the two secondary struts act in opposition to each other, thereby advantageously making it possible to omit one second resilient means from each secondary strut in comparison with a conventional telescopic strut. Nevertheless, the use of two opposing second resilient means in each secondary strut is also possible.

Such use of two secondary struts provides very good control over the movements of the harpoon head and in particular over its centering under the fuselage of the aircraft and also over the application of a force for anchoring the harpoon head to the anchor grid. Finally, the forces generated in each strut, in particular while attaching the harpoon head to the anchor grid of the platform, or else while keeping the aircraft in position on the platform, are better distributed between the main and secondary struts and at the connections between each secondary strut and the aircraft. The two secondary struts are preferably identical.

In a second embodiment of the invention, the deployment device comprises a main strut and a single secondary strut in a V-configuration under the fuselage of the aircraft. The secondary strut has two opposing second resilient means. Each of the main and secondary struts has two opposing resilient means, thus enabling them to vary their lengths so as to center the harpoon head under the fuselage of the aircraft and also apply the force for anchoring the harpoon head to the anchor grid.

Whatever the embodiment of the external anchoring harpoon, the main and secondary struts perform an essential role in controlling the movements and the centering of the harpoon head under the fuselage of the aircraft. Specifically, since the harpoon head is connected to the aircraft by flexible connection means such as a cable, by the frame, and by the movement device, the movements of the harpoon head are random within the movement limits allowed by the struts. Consequently, the main and secondary struts ensure that the harpoon head is oriented in the manner needed for proper operation and in particular in an orientation that needs to be kept close to a vertical direction in order to ensure anchoring to the anchor grid.

Furthermore, since each secondary strut is connected to a structural element of the aircraft, constituting a strong point capable of transmitting forces, any risk of damaging tanks, e.g. during a rough landing, are very limited. Advantageously, these risks are eliminated when the structural elements are elements of the frame for attaching the main landing gear of the aircraft.

In addition, in order to limit the angular movement of the main strut about its elongation axis, the deployment device may include a control rod arranged between the aircraft and the second tube of the main strut. This control rod is arranged in a plane that is substantially normal to the elongation axis of the main strut in the stowed position and that contains the center of the ball-joint connection connecting the main strut to the frame. This control rod serves to cause the main strut to be constrained in rotation about its elongation axis with the aircraft.

The control rod may be connected via a ball-joint connection directly to the aircraft or else via a fitting arranged between the frame and the aircraft. The control rod is also connected to the second tube of the main strut via a ball-joint connection.

The use of this control rod advantageously enables the main strut to conserve a limited angle about its elongation axis relative to the bottom face of the fuselage of the aircraft, and consequently to be effective in keeping the orientation of the harpoon head substantially constant relative to the bottom face of the aircraft, and preferably to keep it close to a vertical direction. This facilitates attaching the harpoon head to the anchor grid. Furthermore, the control rod serves to limit the appearance of interfering movements in the deployment device. This control rod constitutes simple means for replacing a control system having wheels and toothed sectors that would otherwise be more complex and expensive to make.

In particular, the harpoon head remains substantially parallel to the bottom face of the fuselage providing the components of the deployment device and in particular the control rod and its connections with the second tube and with the aircraft are rigid and deform only very little. In contrast, the linkage that is provided limits angular movement of the harpoon head relative to the bottom face of the fuselage. The resulting angle between the harpoon head and the anchor grid is advantageously small, which is favorable for good anchoring of the harpoon head to the grid, including when the aircraft presents an attitude that is greater than that which can be accommodated by existing harpoon devices. This advantage significantly improves the range over which harpooning can be successful in the event of lateral movements of the aircraft.

Furthermore, the deployment device may include a tensioning scissors linkage arranged between the harpoon head and the frame so as to exert a substantially vertical force tending to move the harpoon head away from the frame, and thus to put the cable under tension. The tensioning scissors linkage has a pantograph and at least third resilient means. The tensioning scissors linkage may for example be connected to the harpoon head via at least one ball-joint connection and to the frame via at least one pivot connection.

A permanent force seeking to open the tensioning scissors linkage is supplied via each third resilient means. This permanent force is additional to the force generated by the struts, thus making it easier, if necessary, to achieve anchoring and locking with the anchor grid. Nevertheless, this permanent force is small enough to avoid damaging the platform and/or the aircraft in the event of landing away from the anchor grid, or in the event of landing roughly.

The use of such a scissors linkage may be found to be necessary in particular with the second embodiment of the external anchoring harpoon of the invention and also with the first embodiment when the secondary struts have two opposing second resilient means.

Nevertheless, such a scissors linkage can also be used with the first embodiment including when it has secondary struts, each having only one second resilient means, e.g. for the purposes of facilitating tensioning the cable and/or of anchoring and locking the harpoon head to the anchor grid.

In addition, each strut may have one or more shock absorbers serving to damp the movements of the harpoon head when the strut reaches the end of its stroke. Conventionally, a shock absorber may be hydraulic. Nevertheless, a shock absorber may also be constituted by an elastomer abutment serving to reduce the cost and the weight of the strut.

Furthermore, since the deployment device for deploying the harpoon head are not reversible, the cable need not be under tension while it is on the angle-changer device, as can happen mainly during contact between the harpoon head and the anchor grid and while attaching the harpoon head to the anchor grid. Thus, and in order to avoid the cable escaping from the angle-changer device, and consequently having its movement braked or indeed blocked, the deployment device may also include a device for holding the cable on the angle-changer device. By way of example, such a device may be a cover fastened to the frame or directly on the angle-changer device.

Given the moderate force needed for tensioning the cable, such a holder device may be replaced by fourth resilient means arranged between the harpoon head and the cable. Such fourth resilient means tend to move the cable away from the harpoon head and thus keep the cable under tension on the angle-changer device. The force generated by the fourth resilient means on the cable is nevertheless small enough to avoid disturbing the tensioning of the cable by the movement device. By way of example, the fourth resilient means may be a torsion spring.

Finally, the harpoon head includes a locking device in order to lock the anchoring of the harpoon head to the anchor grid. The locking device may be a hydraulic actuator as is frequently used on a harpoon device. The locking device may also be pneumatic or electric. In addition, the locking device may also include control means that are advantageously independent of the movement device. For example, the locking device may be controlled electrically having an electromechanical device or an electromagnet as control means for causing the harpoon head to lock to the anchor grid.

The present invention also provides an aircraft, such as a rotary wing aircraft or indeed a drone, including an external anchoring harpoon as described above.

The aircraft comprises a fuselage and structural elements. By way of example, a structural element may be a frame for attaching the main landing gear of the invention.

The frame of the external anchoring harpoon may be constituted by a structural element of the aircraft situated on the bottom face of the fuselage, such that the frame has no degree of freedom to move relative to the aircraft. Each secondary strut is connected to a structural element of the aircraft via a ball-joint connection.

The frame of the external anchoring harpoon may equally well be connected to structural elements of the aircraft situated under the fuselage via at least two fittings secured to those structural elements. Each fitting is connected to the frame via a pivot connection and its secondary strut is connected to a structural element of the aircraft by a ball-joint connection via a support.

The means for moving the cable may preferably also be an actuator arranged horizontally under the fuselage of the aircraft.

BRIEF DESCRIPTION OF THE DRAWINGS

The invention and its advantages appear in greater detail from the context of the following description of embodiments given by way of illustration and with reference to the accompanying figures, in which:

FIGS. 5 and 6 show a second embodiment of an external anchoring harpoon; and

Elements present in more than one of the figures are given the same references in each of them.

DETAILED DESCRIPTION OF THE INVENTION

Figure 1:
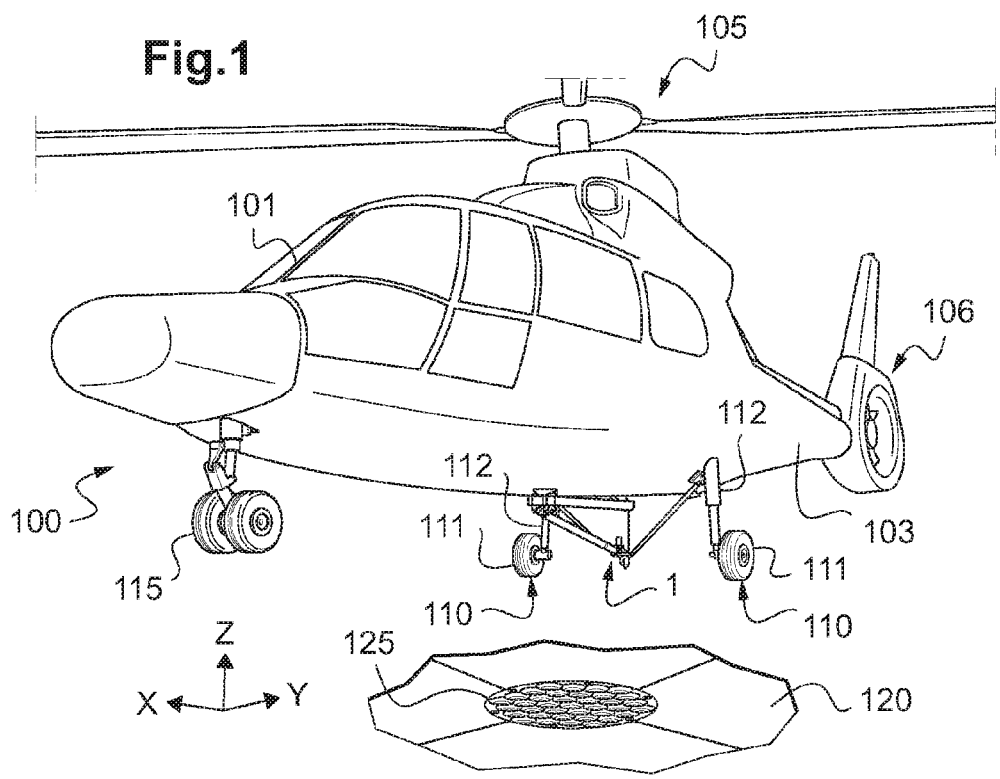
FIG. 1 shows an aircraft having an external anchoring harpoon.

FIG. 1 shows an aircraft 100 having a main rotor 105 positioned about a fuselage 101 and an anti-torque tail rotor 106 positioned at the rear end of a tail boom 103. The aircraft 100 also has main landing gear 110, nose landing gear 115, and an external anchoring harpoon 1 arranged under the fuselage 101 of the aircraft 100. The main landing gear 110 comprises two subassemblies, each comprising a leg 112 secured to the aircraft 100 and a wheel 111.

The external anchoring harpoon 1 is for co-operating with an anchor grid 125 of a platform 120 for landing on a ship in order to make landing of the aircraft 100 on the platform 120 safe, and in order to hold the aircraft 100 down on the platform 120.

The external anchoring harpoon 1 may equally well co-operate with an anchor grid 125 of a landing platform 120 situated on an oil rig or indeed on the roof of a building.

A reference frame X, Y, Z is associated with the aircraft 100. A longitudinal direction X extends from the rear of the aircraft 100 towards the front of the aircraft 100, an elevation direction Z extends upwards perpendicularly to the longitudinal direction X, and a transverse direction Y extends from right to left perpendicularly to the longitudinal direction X and the elevation direction Z.

Two embodiments of the external anchoring harpoon 1 are shown in FIGS. 2 to 6.

In both these embodiments, an external anchoring harpoon 1 comprises a frame 2, a harpoon head 3, and a deployment device 4 for deploying the harpoon 3.

The external anchoring harpoon 1 is arranged so as to be completely under the fuselage 101 of the aircraft 100. The external anchoring harpoon 1 can thus be installed on a large number of aircraft 100 without complicated and expensive adaptation.

The frame 2 is rigid and constituted mainly by two longitudinal beams 21 and 22 and by two crossbars 23 and 24 connecting the two beams 21 and 22 together transversely. The frame 2 is connected to the bottom face of the fuselage 101 by means of the two crossbars 23 and 24 and two fittings 11 and 12 secured to the fuselage 101. Each crossbar 23, 24 is connected to a corresponding fitting 11, 12 by a respective one of two pivot connections. These two pivot connections are in alignment along the longitudinal axis X of the aircraft 100. Each fitting 11, 12 is fastened to a structural element of the aircraft 100.

Furthermore, in each embodiment, the deployment device 4 includes a cable 5 constituting flexible connection means, a movement device 6 for moving the cable 5, a sheave 41, a main strut 7 of elongate shape, and at least one secondary strut 8, 9 of elongate shape. The movement device 6 comprises an actuator having a rod 61 and a cylinder 62 arranged substantially horizontally and parallel to the longitudinal direction X, and thus substantially parallel to the bottom face of the fuselage 101. The cylinder 62 is fastened to the frame 2 by a pivot connection. The cable 5 is connected at a first end 51 to the harpoon head 3 and at a second end 52 to the rod 61 of the movement device 6.

The sheave 41 has a groove in which the cable 5 is guided. The sheave 41 arranged between the movement device 6 and the harpoon head 3 is connected to the frame 2 by a pivot connection. The sheave constitutes an angle-changer device serving to change the direction of tension in the cable 5 from a direction that is substantially horizontal to a direction that is substantially vertical.

The first end 51 of the cable 5 is connected to the harpoon head 3 via a clevis 55. The first end 51 is connected via a rigid end-restraint connection to the clevis 55, the clevis 55 being connected by a ball-joint connection to the harpoon head 3. The second end 52 of the cable 5 is connected to the end of the rod 61 of the actuator 6 so as to form a ball-joint connection between the cable 5 and the rod 61 enabling the cable 5 to accommodate the movement of the actuator 6, thereby limiting the mechanical stresses to which the cable 5 is subjected.

In addition, the main strut 7 is connected by a third end 71 to the harpoon head 3 via a rigid end-restraint type connection and via a fourth end 72 to the frame 2 via a ball-joint connection. Each secondary strut 8, 9 is connected via a ball-joint connection respectively to the harpoon head 3 via the fifth end 81, 91 and to the aircraft 100 via the sixth end 82, 92.

The main strut 7 comprises a first tube 73 and a second tube 74 that can slide relative to each other via a sliding connection, together with two shock absorbers 78, 79 and two first resilient means 76, 77. The two first resilient means 76, 77 are compression springs constituting opposing resilient means and enabling the length of the main strut 7 to vary and enabling it to return to an equilibrium length. The first tube 73 is connected to the harpoon head 3 at the third end 71 and the second tube 74 is connected to the frame 2 at the fourth end 72.

Figure 2:
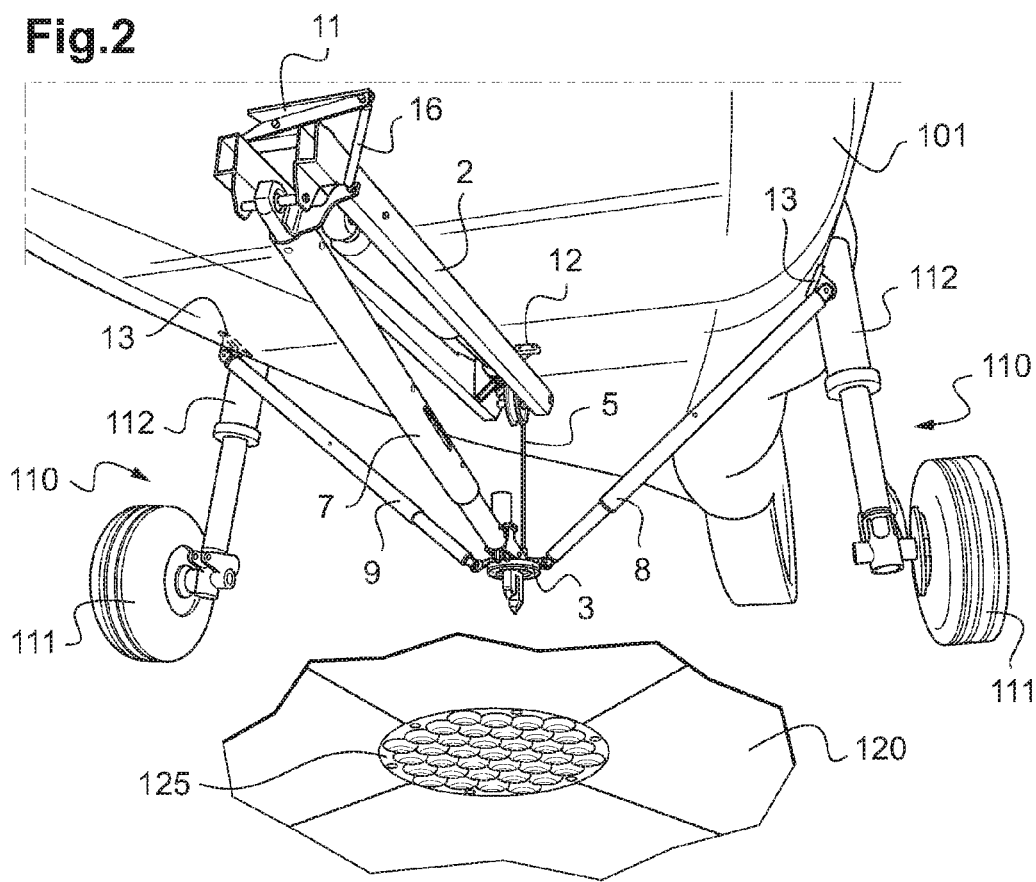
FIGS. 2 to 4 show a first embodiment of an external anchoring harpoon.

Likewise, each secondary strut 8, 9 comprises a third tube 83, 93 and a fourth tube 84, 94 capable of sliding relative to each other via a sliding pivot connection, together with a shock absorber 88, 98 and at least one second resilient means 86, 87, 96. The third tube 83, 93 is connected to the harpoon head 3 at a fifth end 81, 91, and the fourth tube 84, 94 is connected to a strong point of the structure of the aircraft 100 that is capable of transmitting forces at a sixth end 82, 92 via a support 13, as can be seen in FIG. 2.

Whatever the embodiment of the external anchoring harpoon 1, its operation is substantially analogous.

The deployment device 4 enables the harpoon head 3 to be moved essentially vertically relative to the frame 2 and thus relative to the bottom face of the fuselage 101 of the aircraft 100. The main and secondary struts 7 and 8, 9, by virtue of their variable lengths and by virtue of the forces generated by the resilient means 76, 77, 86, 87, 96, serve to control and to limit these movements of the harpoon head 3 in a substantially horizontal plane so as to ensure that the harpoon head 3 is centered under the fuselage 101 of the aircraft 100 and that it is favorably oriented for anchoring on the anchor grid 125. Likewise, the main and secondary struts 7 and 8, 9 also serve, because of the forces generated by their resilient means 76, 77, 86, 87, 96, to apply forces directly vertically downwards on the harpoon head 3, thereby co-operating in anchoring the harpoon head 3 on the anchor grid 125 of the platform 120.

The pivot connections between the frame 2 and the fittings 11, 12 provide hinging between the frame 2 and the aircraft 100, thereby automatically adapting the orientation of the frame 2 depending on the position of the harpoon head 3 and on the traction direction of the cable 5. As a function of movements of the harpoon head 3 in a substantially horizontal plane, the traction direction of the cable 5 may present an angle relative to a vertical direction as taken relative to the bottom face of the fuselage 101 of the aircraft 100. These pivot connections thus enable the plane of the sheave 41 and the traction plane of the cable 5 to be kept in alignment, thereby limiting the mechanical stresses to which the cable 5 is subjected and that are transmitted in particular to the frame 2.

As a result, the external anchoring harpoon 1 serves to distribute the forces to which the harpoon head 3 is subjected both during landing and anchoring on the anchor grid 125, and also while holding the aircraft 100 down on the platform 120. The main strut 7 serves to take up all of the longitudinal forces that are transmitted to the aircraft 100 via the frame 2 and the fittings 11, 12. Each secondary strut 8, 9 serves to take up all of the transverse forces that are transmitted directly to the aircraft 100 via each support 13. Finally, while anchoring the harpoon head 3 in the grid 125, the vertical forces are taken up mainly by the support 13 via the secondary struts 8, 9, whereas the traction force of the cable 5 for holding the aircraft 100 on the platform 120 is taken up mainly by the fitting 12 via the sheave 41 and the frame 2.

Figure 3:
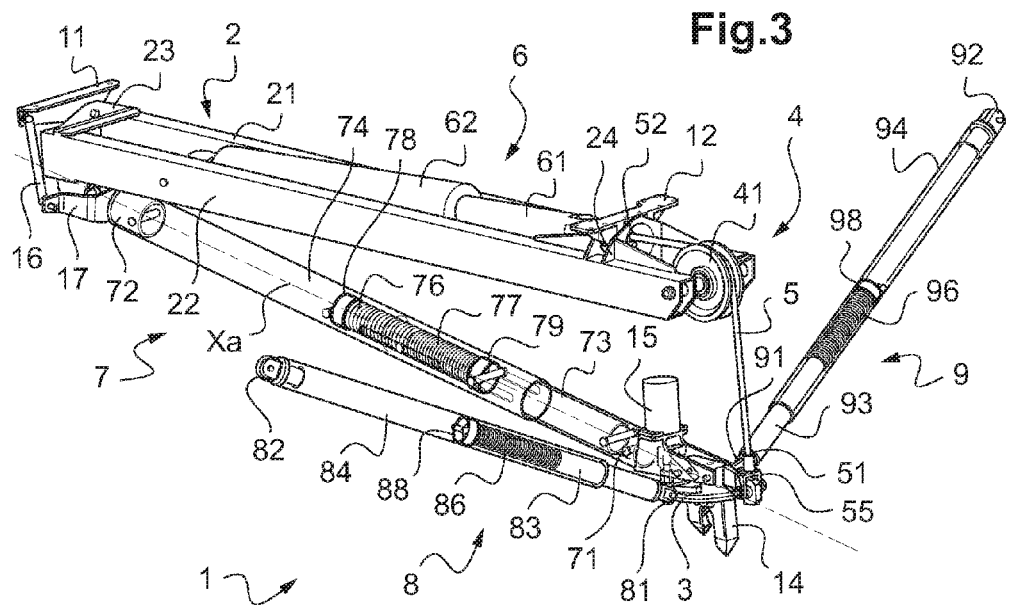
Figure 4:
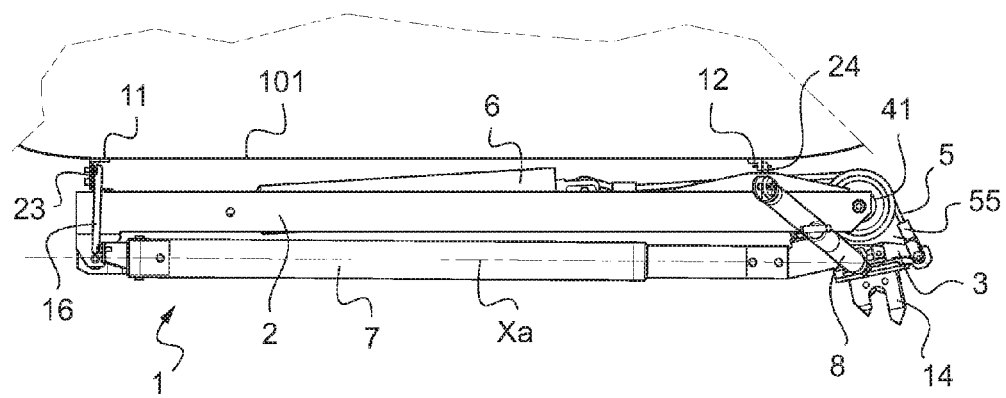

FIGS. 2 to 4 show a first embodiment of the external anchoring harpoon 1 for which the deployment device 4 comprises two secondary struts 8 and 9 arranged on either side of the harpoon head 3, each being provided with single second resilient means 86, 96.

FIG. 2 shows in greater detail how the external anchoring harpoon 1 is installed on the bottom face of the fuselage 101. The two secondary struts 8, 9 are connected via their sixth ends 82, 92 by respective supports 13 at strong points of the structure of the aircraft 100. The two secondary struts 8, 9 are situated in a plane that also contains the harpoon head 3 and the axis of the wheels 111, this plane being substantially parallel to the transverse elevation directions Y and Z. Furthermore, since the two secondary struts 8 and 9 are situated on either side of the harpoon head 3, the two second resilient means 86, 96 behave like two opposing resilient means.

The projections of the main strut 7 and of each secondary strut 8, 9 onto a horizontal plane form an angle of about 90 between one another.

FIG. 4 shows the external anchoring harpoon 1 in its stowed position under the fuselage 101 of the aircraft 100. It can thus be seen that the external anchoring harpoon 1 occupies little space vertically by virtue of using the sheave 41 as angle-changer device together with an actuator 6 in a substantially horizontal position as movement device 6. Furthermore, the actuator 6 is placed as close as possible to the fuselage 101 still for the purpose of minimizing the vertical space occupied by the external anchoring harpoon 1. In this stowed position, the main strut 7 is substantially parallel to the longitudinal direction X.

FIGS. 5 and 6 show a second embodiment of the external anchoring harpoon 1, in which the deployment device 4 has only one secondary strut 8 together with a tensioning scissors linkage 30. This secondary strut 8 has two second resilient means 86, 87 constituting opposing resilient means, and it is preferably connected via its sixth end 82 and a support 13 to a strong point of the structure. The secondary strut 8 lies in a plane that is substantially parallel to the transverse and elevation directions Y and Z and that contains the harpoon head 3 and the axis of the wheels 111.

The projections of the main strut 7 and of the secondary strut 8, 9 onto a horizontal plane form between them an angle of about 90°.

The tensioning scissors linkage 30 is formed by a pantograph 31 with two traction springs 32, 32' constituting third resilient means. The pantograph 31 has two sets of links 33, 33', 34, 34' and it is made as two symmetrical portions connected together by four hinge pins 35, 36, 37, and 38. Two first links 33, 33' are arranged parallel to each other and connected respectively to the harpoon head 3 via a pivot connection at a first hinge pin 35, and two second links 34, 34' are arranged parallel to each other and connected respectively firstly to a first link 33, 33' by a pivot connection via a second hinge pin 36 and secondly to the frame 2 via a ball joint at a third hinge pin 37.

Each traction spring 32, 32' is arranged between the frame 2 and a fourth hinge pin 38 connecting together the second links 34, 34'. Throughout the action zone of the tension scissors linkage 30, the geometry of the pantograph 31 and the way the traction springs 32, 32' are installed serve to obtain a practically constant thrust force that is oriented mainly vertically and downwards. This thrust serves in particular to guarantee the force needed for engaging and locking the harpoon head 3 to the anchor grid 125.

In addition, in the stowed position, as shown in FIG. 6, the position of the tension scissors linkage 30 folded under the fuselage 101 is practically horizontal and favorable to minimizing the space occupied by the external anchoring harpoon 1.

In addition, in both of these embodiments, since the main strut 7 is of elongate shape along an elongation axis Xa, the deployment device 4 includes a control rod 16 arranged between the fitting 11 and the second tube 74 of the main strut 7, as can be seen in FIGS. 3 to 6. This control rod 16 is connected to the fitting 11 and to the second tube 74 via respective ball-joint connections. The control rod 16 serves to constrain together in rotation about the elongation axis Xa the main strut 7 and the fitting 11, and consequently the main strut 7 and the bottom face of the fuselage 110 of the aircraft 100. As a result, the harpoon head 3 has an orientation for which variation is limited firstly by the presence of a slideway connection between the first tube 73 and the second tube 74 of the main strut 7, and secondly by a rigid end-restraint type connection between the first tube 73 and the harpoon head 3.

Figure 7:
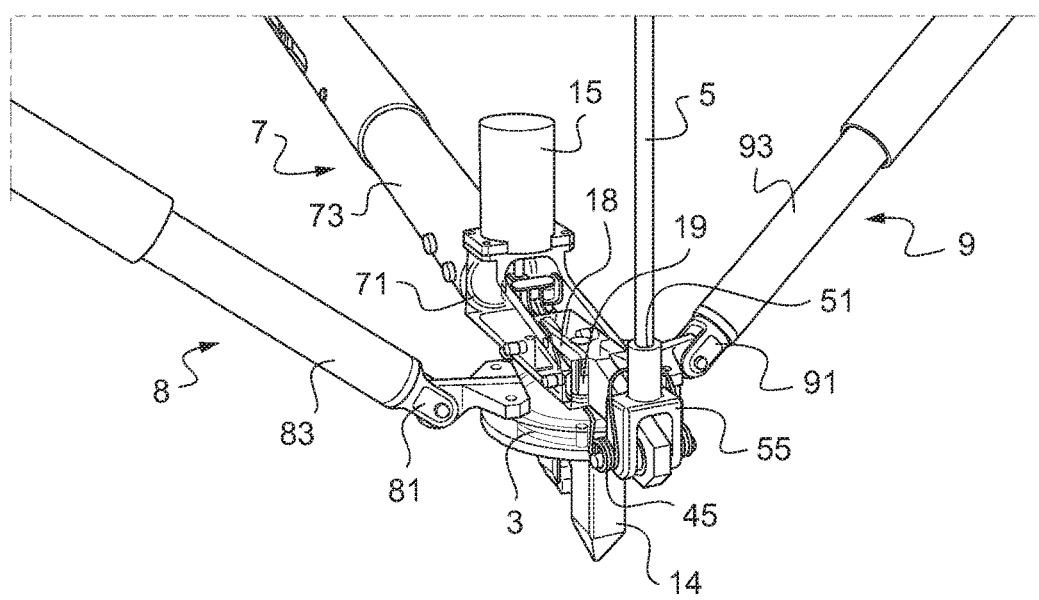
FIG. 7 is a detail view of the harpoon head.

Furthermore, the harpoon head 3 is shown in detail in FIG. 7. The harpoon head 3 has a clamp 14 and a locking device comprising a locking link 18, a locking finger 19, and control means 15 constituted by an electromagnet. Such locking of the clamp 14 to the anchor grid 125 is thus obtained by the electromagnet 15 acting on the locking link 18 causing the locking finger 19 to move so as to prevent the clamp 14 from opening.

FIG. 7 also shows a torsion spring 45 constituting fourth resilient means and forming a device for keeping the cable 5 in the groove of the sheave 41. Specifically, the torsion spring 45 bears against the harpoon head 3 and the clevis 55, thereby moving the cable 5 away from the harpoon head 3 when the cable 5 is not under tension so as to tension the cable 5 and prevent it from leaving the groove in the sheave 41.

The ball-joint connections throughout the external anchoring harpoon 1 are preferably ball-joint connections that are free to move about all axes of rotation. Nevertheless, such a ball-joint connection could have a preferred axis of rotation about which rotation is free while freedom to move angularly about other axes is limited. By way of example, such ball-joint connections may be constituted by resilient balls made of elastomer. Such a connection can also replace the pivot connection of the sheave 41, and the frame 2 may then be connected to the aircraft 100 by a rigid end-restraint type connection.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An external anchoring harpoon for an aircraft for co-operating with an anchor grid of a platform in order both to make landing of the aircraft on the platform safe and also to hold the aircraft down on the platform, the external anchoring harpoon being external to the structure of the aircraft and comprising:
    a frame configured to be connected to the aircraft;
    a harpoon head configured to become anchored in the anchor grid; and
    a deployment device for deploying the harpoon head;
    wherein the deployment device comprises:
        flexible connection means having a first end and a second end and connected via the first end to the harpoon head;
        a movement device for moving the flexible connection means and connected firstly to the frame and secondly to the second end of the flexible connection means;
        a main telescopic strut provided with a third end and a fourth end, and connected via the third end to the harpoon head and via the fourth end to the frame; and
        at least one secondary telescopic strut provided with a fifth end and a sixth end and connected via the fifth end to the harpoon head and configured to be connected via the sixth end to the aircraft.

2. The external anchoring harpoon according to claim 1, wherein the frame is configured to be connected to the aircraft by one or more rigid end-restraint type connections.

3. The external anchoring harpoon according to claim 1, wherein the frame is configured to be connected to the aircraft by at least two pivot connections.

4. The external anchoring harpoon according to claim 1, wherein the movement device comprises a winder device for winding the flexible connection means.

5. The external anchoring harpoon according to claim 1, wherein the movement device comprises an actuator.

6. The external anchoring harpoon according to claim 1, wherein the deployment device comprises an angle-changer device connected to the frame and serving to guide the flexible connection means while it is moving, the angle-changer device being arranged between the movement device and the harpoon head so as to change the direction of the flexible connection means between the movement device and the harpoon head.

7. The external anchoring harpoon according to claim 6, wherein the angle-changer device comprises a sheave connected to the frame by at least one pivot connection.

8. The external anchoring harpoon according to claim 1, wherein the main telescopic strut has a first tube and a second tube capable of sliding relative to each other along a slideway connection, together with two first resilient means, the first resilient means being opposing resilient means, the first tube being connected to the harpoon head via a rigid end-restraint type connection and the second tube being connected to the frame via a ball-joint connection, each secondary telescopic strut having a third tube and a fourth tube capable of sliding relative to each other, the third tube being connected to the harpoon head via a ball-joint connection and the fourth tube being configured to be connected to the aircraft by a ball-joint connection.

9. The external anchoring harpoon according to claim 8, wherein the main telescopic strut is of elongate shape along an elongation axis, and the deployment device includes a control rod configured to be arranged between the second tube and the aircraft in order to constrain the main telescopic strut together with the aircraft in rotation about the elongation axis.

10. The external anchoring harpoon according to claim 1, wherein the deployment device comprises a single secondary telescopic strut having two second resilient means, the second resilient means being opposing resilient means.

11. The external anchoring harpoon according to claim 1, wherein the deployment device comprises two secondary telescopic struts arranged on either side of the harpoon head and each comprising a single second resilient means such that the second resilient means of the two secondary struts act in opposition.

12. The external anchoring harpoon according to claim 1, wherein the deployment device comprises a tensioning scissors linkage arranged between the harpoon head and the frame, the tensioning scissors linkage being provided with a pantograph and at least one third resilient means for tensioning the flexible connection means and simultaneously exerting a substantially vertical force on the harpoon head.

13. The external anchoring harpoon according to claim 1, wherein the external anchoring harpoon includes a locking device for locking the anchoring of the harpoon head on the anchor grid, the locking device including control means independent of the deployment device.

14. An aircraft, wherein the aircraft includes the external anchoring harpoon according to claim 1.

15. The aircraft according to claim 14, wherein the aircraft has a fuselage and structural elements, and the frame of the external anchoring harpoon and each secondary telescopic strut are connected to respective ones of the structural elements under the fuselage.

16. The aircraft according to claim 14, wherein the movement device for moving the flexible connection means comprises an actuator arranged under the fuselage.

* * * * *